(12) United States Patent
Ren et al.

(10) Patent No.: US 11,328,256 B2
(45) Date of Patent: May 10, 2022

(54) TAKT SYSTEM AND METHOD FOR COLLABORATION OF PRODUCTION PROCESSES WITH UNCERTAIN TIME

(71) Applicant: Hefei University of Technology, Anhui (CN)

(72) Inventors: Minglun Ren, Anhui (CN); Liangjia Shao, Anhui (CN)

(73) Assignee: Hefei University of Technology, Hefei (CN)

(*) Notice: Subject to any disclaimer, the term of this patent is extended or adjusted under 35 U.S.C. 154(b) by 0 days.

(21) Appl. No.: 17/078,027

(22) Filed: Oct. 22, 2020

(65) Prior Publication Data

US 2022/0044203 A1 Feb. 10, 2022

(30) Foreign Application Priority Data

Aug. 7, 2020 (CN) .......................... 202010791643.8

(51) Int. Cl.
*G06Q 50/04* (2012.01)
*G06Q 10/10* (2012.01)
*G05B 19/418* (2006.01)
*G06Q 10/06* (2012.01)

(52) U.S. Cl.
CPC ..... *G06Q 10/103* (2013.01); *G05B 19/41865* (2013.01); *G06Q 10/06313* (2013.01); *G06Q 10/06315* (2013.01); *G06Q 10/101* (2013.01); *G06Q 50/04* (2013.01); *G05B 2219/32361* (2013.01)

(58) Field of Classification Search
None
See application file for complete search history.

(56) References Cited

U.S. PATENT DOCUMENTS 6,198,980 B1 * 3/2001 Costanza ......... G05B 19/41865
700/99
10,559,043 B1 * 2/2020 Schlintl .................. G06Q 50/04
(Continued)

OTHER PUBLICATIONS

Due Date Assignment and Dynamic Scheduling of One-of-a-kind Assembly Production with Process Time Uncertain; Yao,Li.
(Continued)

*Primary Examiner* — Sujay Koneru

(57) ABSTRACT

The present invention provides a takt system and method for the collaboration of production processes with uncertain time, which relates to the technical field of task collaboration. The present invention measures the collaboration efficiency of the production processes with indices such as estimated wasted time, and calculates the estimated wasted time by the expectation of the weighted sum of wasted time. For the collaboration of the production processes with uncertain time, the propagation of uncertainty factors and occurrence of wasted time in the collaborative production process are limited in a manner of takt. In different scenarios focusing on the collaboration efficiency and completion probability of the production processes, two takt control models are established, and takt solutions for the collaboration of production processes with uncertain time are obtained by solving the models. The method proposed effectively reduces the wasted time in the production processes and improves the collaboration efficiency.

12 Claims, 3 Drawing Sheets

(56) References Cited

U.S. PATENT DOCUMENTS

| | | | | |
|---|---|---|---|---|
| 2002/0026257 A1* | 2/2002 | Newmark | G05B 19/41805 | 700/108 |
| 2006/0100917 A1* | 5/2006 | Macy | G06Q 10/10 | 705/7.12 |
| 2006/0136085 A1* | 6/2006 | Steinhilper | G05B 19/41865 | 700/111 |
| 2008/0190737 A1* | 8/2008 | Tsujihama | B23P 21/006 | 198/411 |
| 2009/0138334 A1* | 5/2009 | Henby | G06Q 10/06375 | 705/7.37 |
| 2011/0225018 A1* | 9/2011 | Reaume | G06Q 10/06312 | 705/7.27 |
| 2012/0136679 A1* | 5/2012 | McCafferty | G16H 10/60 | 705/3 |
| 2013/0278963 A1* | 10/2013 | Hoarau | G06Q 10/06 | 358/1.15 |
| 2014/0330549 A1* | 11/2014 | Kawai | G05B 17/02 | 703/17 |
| 2015/0098110 A1* | 4/2015 | Zeng | G06F 3/1211 | 358/1.15 |
| 2018/0366005 A1* | 12/2018 | Seenumani | B61L 15/0036 | |
| 2019/0137979 A1* | 5/2019 | Akella | G06T 19/006 | |
| 2019/0286113 A1* | 9/2019 | Halaby Senerman | G05B 19/4188 | |
| 2020/0074376 A1* | 3/2020 | Kotake | G06Q 10/06398 | |
| 2020/0282498 A1* | 9/2020 | Tian | B65G 27/00 | |

OTHER PUBLICATIONS

A scheduling model of logistics service supply chain based on the mass customization service and uncertainty of FLSP's operation time;Weihua Liu,Qian Wang,Qiaomei Mao,Shuqing Wang,Donglei Zhu.

Research on Multi-project Scheduling under Uncertain Environments;WANG,Weixin.

* cited by examiner

TAKT SYSTEM AND METHOD FOR COLLABORATION OF PRODUCTION PROCESSES WITH UNCERTAIN TIME

CROSS-REFERENCE TO RELATED APPLICATIONS

This application claims the benefit of priority from Chinese Patent Application No. 202010791643.8, filed on Aug. 7, 2020. The content of the aforementioned applications, including any intervening amendments thereto, is incorporated herein by reference in its entirety.

TECHNICAL FIELD

The present invention relates to the technical field of task collaboration, in particular to a takt system and method for the collaboration of production processes with uncertain time.

BACKGROUND OF THE PRESENT INVENTION

In the context of novel manufacturing mode and market environment, the customer demand presents a personalized trend of single-piece and small-batches. Manufacturing resources were organized statically within the enterprise, but now they are transformed into dynamic organization in the form of manufacturing services in the global market. Production processes for accomplishing the customer demand are transferred from a single enterprise to a plurality of enterprises. Each service provider undertakes a part of the production task. These changes have an impact on measuring the efficiency of the production process. Throughput which is commonly used in the mass production is not applicable to measure the efficiency of the single-piece small-batch production processes. Because the service providers are distributed in multiple places, it is not enough to only focus on the completion time of the customer demand, but also necessary to take the collaboration efficiency of the production process into consideration.

Many scholars have analyzed the influencing factors of the collaboration efficiency from different aspects and have illustrated the source of production time uncertainty and its description method. A majority of studies mainly focus on result-oriented indices such as total completion time. For example, earliest start time, latest start time or most possible start time are used as reference to organize and control the time so as to achieve the shortest total completion time.

However, the existing method lacks systematic description for the factors, and does not consider the influence of uncertainty degree, completion probability and other factors on collaboration efficiency. In the aspect of the measurement of collaboration efficiency, most of the researches including various time collaboration control methods focus on result-oriented indices such as total completion time, ignoring the measurement of process efficiency such as the degree of wasted time in the service processes, which lack process-oriented indices on collaboration efficiency. The combination of optimized models with simulation method and intelligent algorithms is an effective means to solve the time collaboration problem with uncertainty and also provides a study basis to the present invention. However, in the existing studies, whether a specified distribution or general distribution is used to express the production time, production time must be subject to the same type of distribution, which lacks comprehensive consideration for different production tasks with different types of time distribution functions.

SUMMARY OF THE PRESENT INVENTION

(I) Technical Problems

Aiming at the disadvantages of the prior art, the present invention provides a takt system and method for the collaboration of production processes with uncertain time, which solves the problem in the prior art that the impact of factors such as uncertainty degree, task completion probability and the like on collaboration efficiency is not considered.

(II) Technical Solutions

In order to achieve the above purpose, the present invention is implemented through the following technical solutions:

A takt system and method for the collaboration of production processes with uncertain time includes:

Acquiring information of collaborative production tasks;

Based on the information of the collaborative production tasks, establishing a takt control model for the collaboration of production processes targeting at minimizing the estimated wasted time, wherein the takt control model includes an objective function and constraints;

Solving the takt control model, and outputting a set of time intervals with the minimal estimated wasted time as a takt ST;

$$ST=\{[SS_1,SE_1], \ldots ,[SS_i,SE_i], \ldots ,[SS_n,SE_n]\}$$

SS is the set start time of a task; SE is the set end time of a task; i is a serial number of the task and a service provider; and n is the quantity of tasks and service providers.

Further, the information of the collaborative production tasks includes a service structure, distribution functions of production time and historical wasted time of each task.

Further, the information of the collaborative production tasks also may include a service structure, distribution functions of production time and historical wasted time of each task and task completion probability.

Further, the objective function is:

$$\min \theta_e = \min E[\Sigma_{i,j=1,(i,j)\in A}{}^n \theta_i \theta_j |SS_j - d_i|/n];$$

$\theta$ indicates historical wasted time, and a calculation formula is $$\theta = \Sigma_{i,j=1,(i,j)\in A}{}^n |SS_j - d_i|/n;$$

$\theta_e$ indicates estimated wasted time, and a calculation formula is $$\theta_e = E[\Sigma_{i,j=1,(i,j)\in A}{}^n \theta_i \theta_j |SS_j - d_i|/n];$$

A indicates a set of directly adjacent service pairs;
d indicates an actual end time of the task.
Further, the constraints may be:

$$s_0 = d_0 = 0$$
$$d_i = s_i + t_i$$
$$s_j = \max\{SS_j, \max_{(i,j)\in A}(d_i)\}$$
$$d_{n+1} = s_{n+1} = \max_{(i,n+1)\in A}(SE_i) \leq D$$

-continued $$SS_j \geq SE_i, \forall (i, j) \in A$$

$$SS_i, SE_i \geq 0$$

$$SE_i > SS_i$$

s is the actual start time of a task; t is the production time for the service provider to complete the task; A is the set of directly adjacent service pairs; and D is a completion deadline of a customer demand.

Further, the constraints may also be:

$$s_0 = d_0 = 0$$

$$d_i = s_i + t_i$$

$$s_j = \max\{SS_j, \max_{(i,j) \in A} (d_i)\}$$

$$d_{n+1} = s_{n+1} = \max_{(i,n+1) \in A} (SE_i) \leq D$$

$$SS_j \geq SE_i, \forall (i, j) \in A$$

$$Pr\{t_i \leq SE_i - SS_i\} \geq p$$

$$SE_i > SS_i$$

s is the actual start time of a task; t is the production time for the service provider to complete the task; A is the set of directly adjacent service pairs; D is the completion deadline of the customer demand; p indicates the task completion probability; and Pr{ } is a probability function.

Further, the distribution functions of production time include: a normal distribution $N(\mu, \sigma^2)$ with mean value of $\mu$ and variance of $\sigma^2$, uniform distribution Uniform(a, b) in an interval [a, b] or triangle distribution Triangle(a, m, b) with a modal number of m in the interval [a, b].

Further, in the step of solving the takt control models, a particle swarm optimization algorithm embedded with Monte Carlo Simulation is used, which is specifically as follows:

An objective function value corresponding to each set of time intervals is calculated by Monte Carlo Simulation as fitness of the particle swarm optimization algorithm, then the particle swarm optimization algorithm is used to optimize and solve the problem, and finally the set of time intervals with the minimal estimated wasted time, i.e. the takt is obtained.

In the second aspect, the present invention provides a takt system and method for the collaboration of production processes with uncertain time. The system includes a memory, a processor, and computer programs stored on the memory and capable of running on the processor. The processor implements the steps of the above method when executing the computer programs.

(III) Beneficial Effects

The present invention provides the takt system and method for the collaboration of production processes with uncertain time. Compared with the prior art, the present invention has the following beneficial effects:

The present invention measures the collaboration efficiency of the production processes with indices such as the estimated wasted time and calculates the estimated wasted time by the expectation of the weighted sum of wasted time; and faced with the collaborative production process with uncertain time, the propagation of uncertainty factors and occurrence of wasted time in the collaborative production processes are limited in a manner of takt. Orientating two different scenarios focusing on the collaboration efficiency of the production processes and the task completion probability, two takt control models are established, and takt solutions for the collaboration of production processes with uncertain time are obtained by solving the models. Compared with the prior art using the earliest start time, latest start time and most possible start time as references to organize and control the time, the present invention can reduce the wasted time in the collaborative production process, realize higher process efficiency, and reduce the difficulty for obtaining the effective time control solution. Compared with the time control technology with time buffer, the present invention limits the propagation of the uncertainty at each production task through the takt, which has higher robustness, and can provide better time guidance to the service providers.

BRIEF DESCRIPTION OF THE DRAWINGS

To more clearly describe the technical solutions in the embodiments of the present invention or in prior art, the drawings required to be used in the description of the embodiments or the prior art will be simply presented below. Apparently, the drawings in the following description are merely some embodiments of the present invention, and for those skilled in the art, other drawings can also be obtained according to these drawings without contributing creative labor.

DETAILED DESCRIPTION OF THE PRESENT INVENTION

To make the purpose, technical solutions and advantages of the embodiments of the present invention more clear, the technical solutions in the embodiments of the present invention will be clearly and fully described. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiments of the present invention provide a takt system and method for the collaboration of production processes with uncertain time, which solves the problem in the prior art that the impact of factors such as uncertainty degree, task completion probability and the like on collaboration efficiency is not considered, and achieves the purpose of wasted time reduction in the collaborative production process and higher process efficiency.

In order to better understand the above technical solutions, the above technical solutions are described below in detail in combination with accompanying drawings and specific embodiments.

Embodiment 1

Figure 1:
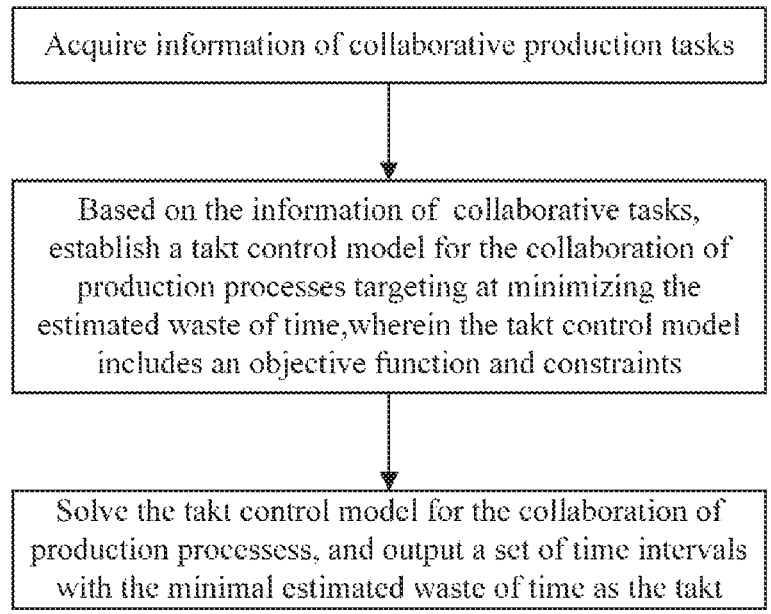
FIG. 1 is a flow chart of embodiments of the present invention.

As shown in FIG. 1, the present invention provides a takt system and method for the collaboration of production processes with uncertain time, which is applicable to the takt control problem for the collaboration of production processes with uncertain time focusing on the collaboration efficiency. The method is executed by a computer, and includes:

Information of collaborative production tasks is acquired.

Based on the information of the collaborative production tasks, takt control model targeting at minimizing the estimated wasted time is established, wherein the takt control model includes an objective function and constraints.

The takt control model is solved, and a set of time intervals with the minimal estimated wasted time is outputted as takt ST.

$$ST=\{[SS_1,SE_1], \ldots ,[SS_i,SE_i], \ldots ,[SS_n,SE_n]\}$$

SS is the set start time of a task; SE is the set end time of a task; i is a serial number of task and service provider; and n is the quantity of tasks and service providers.

The present embodiment has the beneficial effects:

Embodiment 1 of the present invention measures the efficiency of the collaborative production process with indices such as the estimated wasted time and calculates the estimated wasted time by the expectation of the weighted sum of wasted time; and faced with the collaborative production process with uncertain time, the propagation of uncertain factors and occurrence of wasted time in the collaborative production processes are limited in a manner of takt. For the scenario focusing on the collaboration efficiency of the production processes, takt control model is established, and a takt solution for the collaboration of production processes with uncertain time is obtained by solving the model. Compared with the prior art using the earliest start time, latest start time and most possible start time as references to organize and control the time, embodiment 1 of the present invention can reduce the wasted time in the collaborative production processes, realize higher process efficiency, and reduce the difficulty for acquiring the effective time control solution. Compared with the time control technology with time buffer, embodiment 1 of the present invention limits the propagation of the uncertainty at each production task through the takt, which has higher robustness, and can provide better time guidance to the service providers.

The Following Takes the Automobile Co-Manufacturing as an Example to Describe an Implementation Process of Embodiments of the Present Invention in Detail:

The Information of Collaborative Production Tasks is Acquired:

Customized automobile demand is collaboratively completed by n=10 service providers, i.e. an automobile modeling design task, an automobile function design task, a process planning task, a parts purchasing task, a standard parts stamping task, a customized parts stamping task, a chassis welding task, a components welding task, an automobile coating task and an automobile assembly task. A completion deadline of the customer demand is limited as D=110 days.

Figure 2:
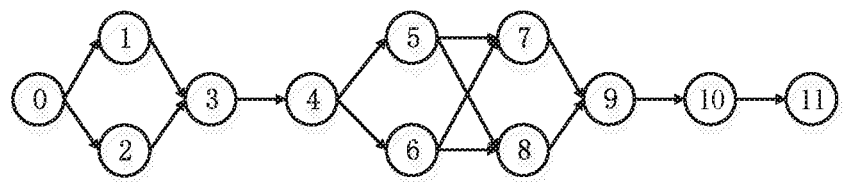
FIG. 2 is a schematic diagram of a service structure in embodiment 1 of the present invention.

Based on the service structure, temporal constraints among tasks i.e. automobile collaborative production network can be obtained, as shown in FIG. 2. The collaborative production network also includes a start node with a node number of 0, that is, node 0 and an end node with a node number of n+1 (node 11). That is, the whole network includes n+2 nodes in total.

At the same time, the distribution function of production time $f_i(t)$ is assumed according to the uncertainty of the automobile manufacturing tasks. An automobile collaborative production tasks information table is shown in Table 1. $N(\mu, \sigma^2)$ indicates normal distribution with a mean value of $\mu$ and a variance of $\sigma^2$; Uniform(a, b) indicates the uniform distribution in an interval [a, b]; and Triangle(a, m, b) indicates triangle distribution with a modal number of m in the interval [a, b].

TABLE 1

Information table of automobile collaborative production tasks

| Node Serial number | Task name | Preceding constraint | Production time distribution | Historical wasted time |
|---|---|---|---|---|
| 0 | Start | — | 0 | — |
| 1 | Automobile modeling design | 0 | Triangle (10, 15, 18) | 1.5 |
| 2 | Automobile function design | 0 | Triangle (8, 10, 15) | 1.3 |
| 3 | Process planning | 1, 2 | Uniform(10, 12) | 1 |
| 4 | Parts purchasing | 3 | Uniform(8, 10) | 1.4 |
| 5 | Standard parts stamping | 4 | $N(8, 1^2)$ | 0.8 |
| 6 | Customized parts stamping | 4 | $N(10, 1.25^2)$ | 1.1 |
| 7 | Chassis welding | 5, 6 | Uniform(4, 6) | 0.8 |
| 8 | Components welding | 5, 6 | Uniform(4, 8) | 0.8 |
| 9 | Automobile coating | 7, 8 | Triangle (4, 5, 6) | 1.2 |
| 10 | Automobile assembly | 9 | $N(3, 0.8^2)$ | 1.1 |
| 11 | End | 10 | 0 | — |

Establishment of Takt Control Model:

In order to control the time in the production process with variability, a takt control model (i.e. TCCM model) aiming at minimizing the estimated wasted time is established to provide time guidance for multiple service providers in the collaborative process to realize the effective connection among tasks, which can meet the requirements for time collaboration from multiple dimensions such as materials and manpower and reduce the wasted time to improve the collaboration efficiency.

Since the historical wasted time $\theta$ and the estimated wasted time $\theta_e$ are negative indices, the lower the value, the higher the collaboration efficiency. Therefore, the minimum estimated wasted time $\Gamma(\theta_e, Fa)=\min \theta_e(Fa)$ is selected as the objective function:

$$\min \theta_e = \min E[\Sigma_{i,j=1,(i,j)\in A}{}^n \theta_i \theta_j |SS_j - d_i|/n] \quad 5$$

Constraints are:

① $s_0 = d_0 = 0$, indicating that the start and end time of the start node are both 0, that is, the task connected to the start node can be executed from the moment 0.

② $d_i = s_i + t_i$, indicating the relation among the actual end time, actual start time and the production time of the task.

③

$$s_j = \max\left\{SS_j, \max_{(i,j)\in A}(d_i)\right\},$$

indicating that the task should be started immediately after reaching the set start time and the condition that the preceding task has been finished so as to reduce the idle time between the tasks.

④

$$d_{n+1} = s_{n+1} = \max_{(i,n+1)\in A}(SE_i) \leq D,$$

indicating that the completion time of the entire collaborative production process should satisfy the deadline set by the customer, and this constraint may be relaxed as $\forall i \in [0, n]$, $SE_i \leq D$, that is, all tasks should be finished within the time set by the customer.

⑤ $SS_j \geq SE_i$, $\forall (i, j) \in A$, indicating that the set start time of the successive task in the directly adjacent task pair having the temporal relation must be later than the set end time of the preceding task.

⑥ $SE_i > SS_i$, indicating that the set end time of a task in the takt should be greater than the set start time, that is, the span of a time interval of the task set in the takt should be greater than 0.

⑦ $SS_i$, $SE_i \geq 0$, indicating that the set start time and set end time of any task in the takt should both be greater than or equal to moment 0.

Solution of Service Takt Collaboration Control Models:

Time collaboration control of the present embodiment is a combinatorial optimization problem in a finite time interval [0,D]. The model has the production time $t_i$ serving as a random variable, which makes the estimated wasted time corresponding to the takt have variability, and can be solved through the existing algorithm.

Figure 3:
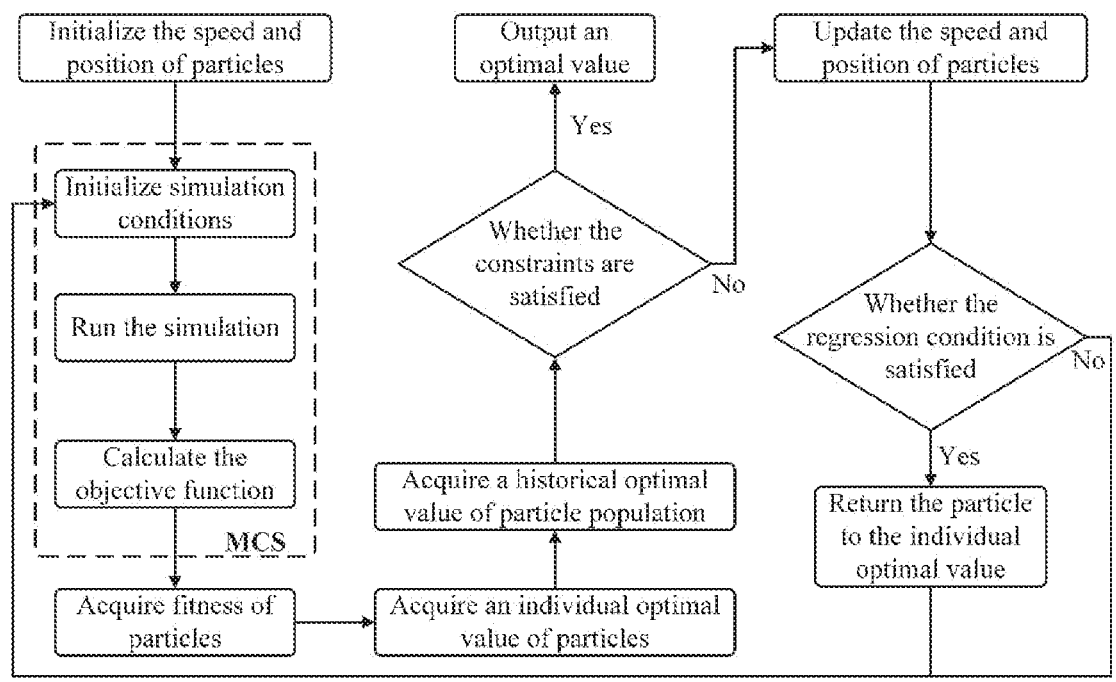
FIG. 3 is a flow chart of a particle swarm optimization algorithm embedded with Monte Carlo Simulation in embodiment 1 of the present invention.

Therefore, embodiments of the present invention utilize the particle swarm optimization algorithm embedded with Monte Carlo Simulation, and the algorithm flow is shown in FIG. 3. The objective function value corresponding to each set of time intervals $\{[SS_1, SE_1], \ldots, [SS_i, SE_i], \ldots, [SS_n, SE_n]\}$ is calculated by Monte Carlo Simulation (MCS) as fitness of the particle swarm optimization algorithm; then the Particle Swarm Optimization (PSO) algorithm is used to optimize and solve the problem; and finally the set of time intervals with the minimal estimated wasted time, i.e. the takt is obtained.

Specific steps are as follows:

Initialization of Particle Swarm Optimization Algorithm and Monte Carlo Simulation:

A time sequence formed by takt forms a particle. Each position of the particle represents a set start time or end time node of the task. According to the constraints, the speed and position of Q initial particles are randomly generated, and the $q^{th}$ particle in the population is expressed as:

$$x_q = (x_{q1}, x_{q2}, \ldots, x_{q(2n-1)}, x_{q(2n)})$$

The Monte Carlo Simulation is initialized with the takt represented by the particle. According to the distribution function of production time $t_i$, the integer sampling is carried out to generate a sample $t_i^k$, i=1, 2, ..., n, and the estimated wasted time of the production process $tw^k = \theta = \Sigma_{i,j=1,(i,j)\in A}{}^n \theta_i \theta_j |SS_j - d_i|/n$ is calculated, which is repeated for K times. Results are accumulated $TW^k = TW^{k-1} + tw^k$, $TW^0 = 0$, and $\theta_q = TW^K/K$ is returned as the fitness of the particle q.

Particle Swarm Optimization Algorithm:

An individual optimal value $y_{qi}$ of the particle and a historical optimal value $y_{gi}$ of the population are obtained according to the particle fitness in the initialization result. The particle is updated according to a speed updating formula, and the speed updating formula is as follows:

$$v_{qi} = rv_{qi} + c_1 \text{rand}(\ )(y_{qi} - x_{qi}) + c_2 \text{rand}(\ )(y_{gi} - x_{qi})$$

$v_{qi}$ is the speed of the particle q on an $i^{th}$ position, $v_{qi} \in [-v_{imax}, v_{imax}]$, and $v_{imax}$ is a maximal speed of the particle q on the $i^{th}$ position; $c_1$ and $c_2$ are constants enabling the particle to have the capacity of summarizing itself and learning from outstanding individuals in the population; rand( ) is a random number of [0,1]; q=1, 2, ..., Q, and Q is a scale of the population; and i=1, 2, ..., 2n.

r is an inertia weight and utilizes a linear differential diminishing strategy:

$$r = r_{max} - \frac{m^2}{M^2}(r_{max} - r_{min})$$

$r_{max}$ and $r_{min}$ are a maximal weight coefficient and a minimal weight coefficient respectively. m is iteration times, and M is the maximal iteration times.

$x_{qi}$ is the value of the particle q on the $i^{th}$ position.

$$x_{qi} \begin{cases} y_{qi}, & \text{if } x_{qi} + v_{qi} < 0 \\ y_{qi} + v_{qi}, & \text{if } x_{qi} + v_{qi} \geq 0 \end{cases}$$

A regression thought is introduced to regress the particle which cannot satisfy the constraints after being updated, so that the particle can be returned to the individual optimal value to participate in the next iteration. When the population is in a large scale, the particle is regressed to the individual optimal value, so that not only the quantity of the particle population but also the diversity of the particles can be guaranteed, and the early local optimum can be avoided. The algorithm is terminated with the maximal iteration times M.

Symbols and meanings of parameters are shown in Table 2:

TABLE 2

| Symbol | Meaning |
| --- | --- |
| i, j | Serial number of task and service provider |
| n | Quantity of tasks and service providers |
| (i, j) | Service pair |
| A | Set of directly adjacent task pairs |

TABLE 2-continued

| Symbol | Meaning |
|---|---|
| N | Task set (including a start virtual node and an end virtual node) |
| Fa | Set of takt influence factors |
| $SS_i$ | Set start time of task i |
| $SE_i$ | Set End time of task i |
| D | Completion deadline of customer demand |
| p | Task completion probability |
| $\theta_e$ | Estimated wasted time |
| $\theta$ | Historical wasted time |
| $t_i$ | Production time for the service provider i to complete the task i |
| $s_i$ | Actual start time of task i |
| $d_i$ | Actual end time of task i |
| $f_i(t)$ | Distribution function of production time $t_i$ |
| $F_i^{-1}$ | Inverse cumulative probability distribution of the production time $t_i$ |
| $\Gamma(\theta_e, Fa)$ | Optimization function of estimated wasted time $\theta_e$ |

Description about above-mentioned nouns:

Takt (ST) is a set of time intervals determined based on influencing factors related the collaborative production process and targeting at minimizing the estimated wasted time $\theta_e$ among services. Each time interval contains two variables, i.e. set start time $SS_i$ and set end time $SE_i$. ST is expressed as:

$$ST=\{[SS_1,SE_1], \ldots, [SS_i,SE_i], \ldots, [SS_n,SE_n]|\Gamma(\theta_e, Fa)\};$$

The estimated wasted time $\theta_e$ is a measure index of the waste degree of time possibly occurring in the collaborative production process, reflecting the estimated time utilization efficiency in the multi-agent collaboration process, and belonging to a negative ex ante index. Due to the uncertainty of the production time, the collaboration efficiency of the production process corresponding to the same takt may be different. Therefore, the expectation of the weighted sum of wasted time is selected as a measure method of the estimated wasted time, and a mathematic form is:

$$\theta_e = E[\Sigma_{i,j=1,(i,j)\in A}^n \theta_i \theta_j |SS_j-d_i|/n]$$

$\Gamma(\theta_e, Fa)$ is the optimization function of the estimated wasted time $\theta_e$; and since the estimated wasted time is the negative index $\Gamma(\theta_e, Fa)=\min \theta_e(Fa)$.

The estimated wasted time is a stable value of the service collaboration efficiency considering the variability of the production time. $\theta_i \theta_j$ indicates a product of the historical wasted time of the directly adjacent service pairs, reflecting the influence of the historical cooperation on the present cooperation. The service with no historical data may be substituted by a reciprocal of the service credit.

Fa is a set of factors influencing the collaborative production process, i.e. the information of the collaborative production tasks, including the service structure, distribution function $f_i(t)$ of production time $t_i$, historical wasted time $\theta$ of each task, the quantity n of service providers, task completion probability p, etc.

The quantity n of the service providers: orders received by a platform are broken down into n tasks according to the customer demand, and each task is matched with a service according to an optimization rule.

The production time $t_i$ is the time for a service provider to complete the task. It depends on attributes such as the complexity or difficulty of the task and the capacity of the service provider. The production time can be estimated according to the completion time of previous similar tasks and can be modeled by utilizing the probability distribution, fuzzy numbers or gray numbers and other modes according to the degree of uncertainty. $f_i(t)$ indicates the distribution function of production time $t_i$. The variability of the production time makes the actual start time s and actual end time d of each service in the collaborative process uncertain, and the uncertainty may be propagated and accumulated along the service network.

The service structure is a non-resource-constrained temporal relation of the service pair (i, j). A indicates the set of directly adjacent service pairs. When $(i, j) \in A$, it means that the service i is a preceding service of the service j; there is a temporal relation between the services, which is manifested as that the service j can be started when and only when the service i is finished. When $(i, j) \notin A$, there is no direct temporal relation between the service i and the service j.

The historical wasted time $\theta$ is a mean value of the total time wasted in the collaborative process with multiple service providers, reflecting the time utilization efficiency of the completed production process. The greater the value, the lower the collaboration efficiency. This value belongs to the negative ex post index and may be used as a reference index of the collaboration capacity of the service providers.

The mathematic form is as follows:

$$\theta = \Sigma_{i,j=1,(i,j)\in A}^n |SS_j-d_i|/n.$$

Embodiment 2

Embodiments of the present invention provide another takt system and method for the collaboration of production processes with uncertain time. The method can be applied to the takt control problem focusing on the task completion probability and aiming at the collaboration of the production processes with uncertain time.

The takt control model in embodiment 1 only requires the time span allocated to any task in the takt to be greater than 0 and gives no consideration to the completion capacity (i.e. task completion probability) of the service provider within the set time interval. If the task completion probability of the service provider within the time interval allocated in the takt is excessively low, the timely completion probability of the entire production process may be reduced, and the feasibility and robustness of the takt may also be reduced. Parkinson's Law and theories of student syndrome indicate that no matter how much time is allocated, the service provider may probably complete the task until the deadline. However, blindly pursuing high completion probability may result in the extension of total completion time and invisible time waste. Therefore, to set the rational task completion probability not only can guarantee the completion of the task, but also can improve the collaboration efficiency.

In order to achieve the above purpose, compared with embodiment 1, the method of the present embodiment has the difference in that the present embodiment also considers the task completion probability for establishing the takt control model (TCCM-p), that is, on the basis of the TCCM model in embodiment 1, the constraint is added.

Specifically:

In the present embodiment, the information of the collaborative production tasks includes a service structure, distribution function $f_i(t)$ of production time $t_i$, historical wasted time $\theta$ of each task, the quantity n of service providers and task completion probability p.

The objective function in the takt control model is as follows:

$$\min \theta_e = \min E[\Sigma_{i,j=1,(i,j)\in A}^n \theta_i \theta_j |SS_j-d_i|/n]$$

Constraints are:

⑧ $s_0=d_0=0$, indicating that the start and end time of the start node are both 0, that is, the task connected to the start node is executed from the moment 0.

⑨ $d_i=s_i+t_i$, indicating the relation among the actual end time, actual start time and the production time of the task.

⑩
$$s_j = \max\left\{SS_j, \max_{(i,j)\in A}(d_i)\right\},$$

indicating that the task should be started immediately after reaching the set start time and the condition that the preceding task has been finished so as to reduce the idle time between the tasks.

⑪
$$d_{n+1} = s_{n+1} = \max_{(i,n+1)\in A}(SE_i) \leq D,$$

indicating that the completion time of the entire collaborative production process should satisfy the deadline set by the customer, this constraint may be relaxed as $\forall i \in [0, n]$, $SE_i \leq D$, that is, all tasks should be finished within the time set by the customer.

⑫ $SS_j \geq SE_i$, $\forall (i, j) \in A$, indicating that the set start time of the successive task in the directly adjacent task pair having the temporal relation must be later than the set end time of the preceding task.

⑬ $\Pr\{t_i \leq SE_i - SS_i\} \geq p$, indicating the task completion probability that should be satisfied by the time span of each task in the takt, which is equal to $SE_i - SS_i \geq F_i^{-1}(p)$; since the production time $t_i > 0$, $i=1, \ldots, n$, $SE_i - SS_i > 0$, that is $SE_i > SS_i$ is already contained in the present constraint; and therefore, the constraint 13 is used to replace the constraint 6.

⑭ $SS_i$, $SE_i \geq 0$, indicating that the set start time and set end time of any task in the takt should both be greater than or equal to moment 0.

Besides the beneficial effects stated in embodiment 1, the present embodiment also has the following beneficial effects: in the prior art, the impact of the task completion probability on the result is not considered. The present embodiment establishes another takt control model aiming at the scenario focusing on the completion probability of the production processes, and obtains the takt solution for the collaboration of production processes with uncertain time by solving the model. By setting the rational probability, the present embodiment not only can guarantee the completion of the task, but also can improve the collaboration efficiency. Different set probabilities can meet the time control requirements of different customers or cloud platforms for the collaboration of production processes.

Explanations, examples and beneficial effects of other relevant contents may refer to the corresponding description in embodiment 1 and are not repeated herein.

Verification Experiment

In order to verify the feasibility of embodiments 1 and 2 in the present invention, in combination with Table 1, 10 groups of comparative experiments composed of two groups of production time distributions (unit of the production time: days), i.e. corresponding to experiment 1 and experiment 2 in Table 3, no set probability (corresponding to the TCCM model), and four task completion probabilities (corresponding to TCCM-p model) are designed, in order to show the relation among the uncertainty of the production time, the task completion probability and the estimated wasted time. For the TCCM-p model, p is set respectively as 0.8, 0.9, 0.95 and 0.99; four decimal places are kept for the estimated wasted time; and the service takt is in an integer interval.

TABLE 3

| Node Serial number | Task name | Production time distribution (Experiment 1) | Production time distribution (Experiment 2) |
|---|---|---|---|
| 0 | Start | 0 | 0 |
| 1 | Automobile modeling design | Triangle (10, 15, 18) | Triangle (7, 12, 18) |
| 2 | Automobile function design | Triangle (8, 10, 15) | Triangle (7, 8, 15) |
| 3 | Process planning | Uniform(10, 12) | Uniform(7, 12) |
| 4 | Parts purchasing | Uniform(8, 10) | Uniform(6, 10) |
| 5 | Standard parts stamping | $N(8, 1^2)$ | $N(6, 2^2)$ |
| 6 | Customized parts stamping | $N(10, 1.25^2)$ | $N(8, 2.5^2)$ |
| 7 | Chassis welding | Uniform(4, 6) | Uniform(3, 6) |
| 8 | Components welding | Uniform(4, 8) | Uniform(3, 8) |
| 9 | Automobile coating | Triangle (4, 5, 6) | Triangle (3, 4, 6) |
| 10 | Automobile assembly | $N(3, 0.8^2)$ | $N(2, 1.5^2)$ |
| 11 | End | 0 | 0 |

Output results are shown in Table 4:

TABLE 4

| Experiment | Task completion probability setting | takt | Estimated wasted time |
|---|---|---|---|
| Experiment 1 | No set probability | {[4, 18], [4, 18], [18, 29], [31, 42], [43, 56], [43, 56], [58, 65], [58, 66], [67, 75], [81, 85]} | 4.2275 |
| | p = 0.8 | {[2, 19], [5, 19], [21, 34], [35, 46], [46, 56], [47, 59], [61, 67], [60, 68], [69, 77], [77, 105]} | 4.5728 |
| | p = 0.9 | {[1, 18], [3, 19], [19, 31], [33, 43], [44, 57], [43, 57], [58, 65], [58, 66], [66, 74], [77, 88]} | 4.6178 |
| | p = 0.95 | {[4, 21], [6, 21], [22, 34], [37, 48], [51, 63], [49, 62], [63, 70], [63, 72], [74, 80], [83, 95]} | 5.1504 |
| | p = 0.99 | {[4, 22], [3, 18], [22, 35], [35, 46], [49, 60], [46, 59], [64, 70], [62, 71], [73, 80], [81, 91]} | 5.6185 |

TABLE 4-continued

| Experiment | Task completion probability setting | takt | Estimated wasted time |
|---|---|---|---|
| Experiment 2 | No set probability | {[6, 11], [2, 11], [15, 26], [28, 40], [40, 52], [41, 50], [55, 60], [54, 66], [66, 70], [73, 96]} | 5.2931 |
| | p = 0.8 | {[0, 17], [0, 15], [18, 32], [33, 44], [45, 54], [44, 57], [59, 66], [57, 65], [66, 75], [75, 99]} | 6.4129 |
| | p = 0.9 | {[4, 20], [5, 20], [22, 35], [36, 46], [47, 60], [46, 61], [61, 70], [62, 73], [74, 80], [82, 98]} | 6.7672 |
| | p = 0.95 | {[1, 20], [0, 15], [20, 33], [35, 45], [46, 58], [47, 61], [61, 68], [61, 69], [71, 77], [79, 100]} | 7.1952 |
| | p = 0.99 | {[0, 19], [0, 17], [22, 34], [34, 44], [46, 57], [44, 59], [61, 69], [61, 70], [70, 76], [79, 100]} | 7.8024 |

Figure 4:
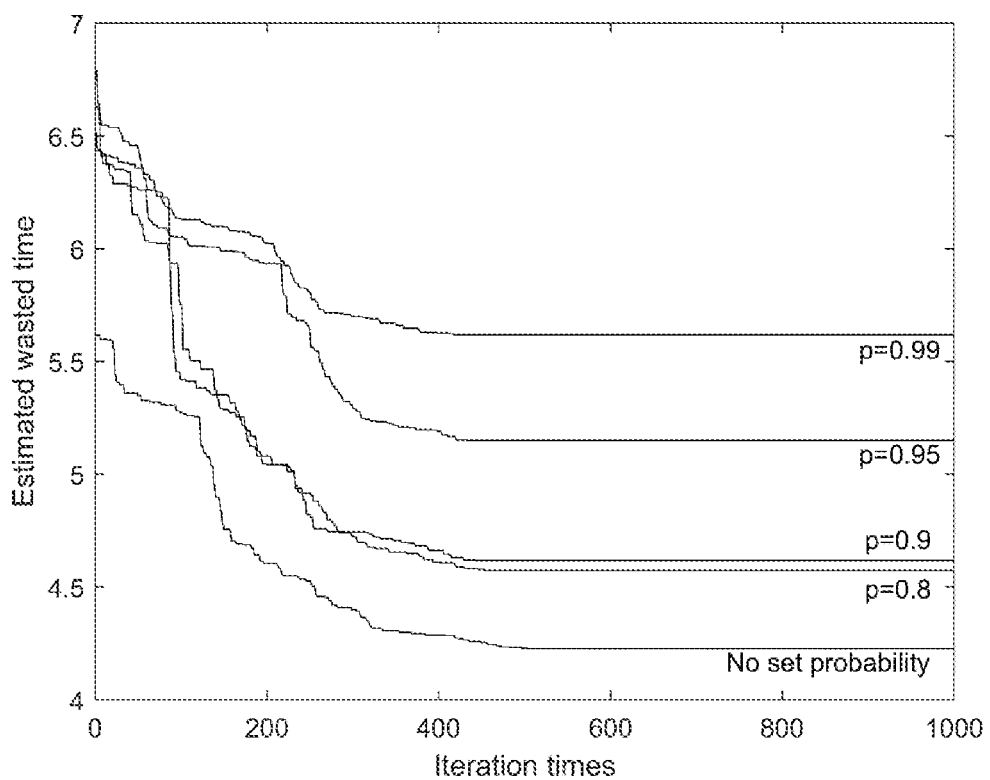
FIG. 4 is a schematic diagram of a relationship between iteration times and estimated wasted time of experiment 1 in embodiments of the present invention.
Figure 5:
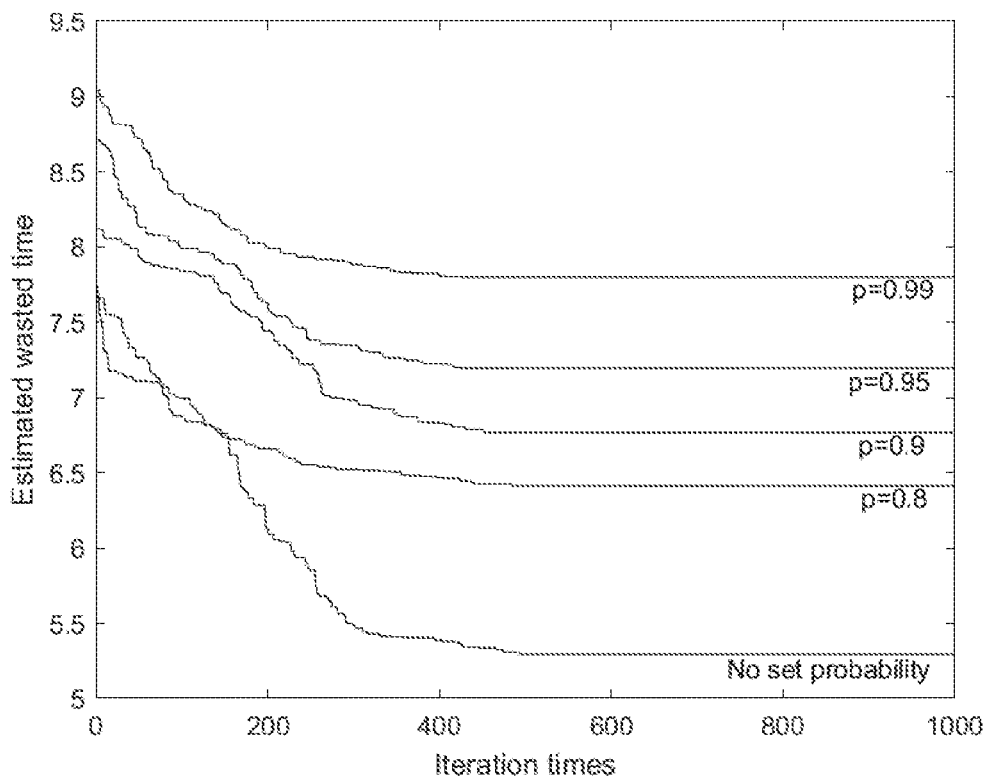
FIG. 5 is a schematic diagram of a relationship between iteration times and estimated wasted time of experiment 2 in embodiments of the present invention.

The relation between the iteration times and the estimated wasted time in experiments 1 and 2 is as shown in FIGS. 4-5.

It can be seen from FIG. 4 and FIG. 5 that whether there are requirements for setting the task completion probability, experiment 1 and experiment 2 are both converged within the experimental set times, which states that the experiment 1 and experiment 2 can find the takt with the minimal estimated wasted time to control the time for the collaboration of production processes with uncertain time, thereby verifying the feasibility of the TCCM model and TCCM-p model.

Moreover, the estimated wasted time without the setting of the task completion probability is lower than that with the setting of the task completion probability, that is, the estimated collaboration efficiency is higher. In the case of setting the task completion probability, with the increase of the task completion probability, the estimated wasted time increases, and the estimated collaboration efficiency decreases.

According to the time span allocated in the takt in Table 4 to the service provider, the corresponding task completion probability can be calculated. The task completion probability represents the possibility for the service provider to complete the task within the time. The average task completion probability of the 10 services is obtained, as shown in Table 5:

TABLE 5

| | Setting requirements of task completion probability | | | | |
|---|---|---|---|---|---|
| | None | 0.8 | 0.9 | 0.95 | 0.99 |
| Average task completion probability in experiment 1 | 0.85918 | 0.98522 | 0.99576 | 0.99501 | 0.99904 |
| Average task completion probability in experiment 2 | 0.68112 | 0.98952 | 0.99366 | 0.99904 | 0.99912 |

It can be known from Table 5 that under the condition without the setting requirement of the task completion probability, the obtained average task completion probability of the takt is relatively low, which is due to the reason that the short time span of some tasks in the takt may lower the task completion probability, which increases the risk in delaying the task completion and disturbing the service planning process. Therefore, rational setting of the task completion probability guarantees the balance between the task completion possibility and the estimated collaboration efficiency, which is conducive to finding the most rational takt to control the time for the collaborative production process.

It can be seen from the calculation according to each production time distribution in Table 3 that a standard deviation of the production time in experiment 2 is greater than that in experiment 1, which states that the uncertainty of the production time in experiment 2 is greater than that in experiment 1. It can be seen from Table 3 that under the same setting condition of the task completion probability, the estimated wasted time of experiment 2 is greater than that of experiment 1. Therefore, it can be concluded that with the increase of the uncertainty, the estimated wasted time is higher and the estimated collaboration efficiency is lower. Moreover, the difference of the estimated time waste with setting the task completion probability is apparently greater than that without setting the task completion probability. The difference of the estimated wasted time under the same condition is increased with the increase of the uncertainty of the production time, which indicates that compared with the TCCM-p model, the TCCM model has higher robustness and pays more attention to the estimated collaboration efficiency.

Embodiment 3

The present invention further provides a takt system and method for the collaboration of production processes with uncertain time. The system includes a memory, a processor, and computer programs stored on the memory and capable of running on the processor. The processor implements the steps of the above method when executing the computer programs.

It can be understood that the takt system and method for the collaboration of production processes with uncertain time provided in the embodiments of the present invention corresponds to the takt system and method for the collaboration of production processes with uncertain time. Explanations, examples and beneficial effects of relevant contents of the system can refer to the corresponding description in the takt system and method for the collaboration of production processes with uncertain time, and are not repeated herein.

In Conclusion, Compared with the Prior Art, the Present Invention at Least has the Following Beneficial Effects:

(I) Embodiment 1 of the present invention measures the efficiency of the collaborative production processes with the indices such as the estimated wasted time, and calculates the estimated wasted time by the expectation of the weighted sum of wasted time; and for the collaboration of production processes with uncertain time, the propagation of uncertain factors and occurrence of time wasted in the collaborative production process are limited in a manner of takt. Aiming at the scenario focusing on the collaboration efficiency of the production process, takt control model is established, and a takt solution for the collaboration of production processes with uncertain time is obtained by solving the model. Compared with the prior art using the earliest start time, latest start time and most possible start time as references to organize and control the time, embodiment 1 of the present invention can reduce the wasted time in the collaborative production process, achieve higher process efficiency, and reduce the difficulty for acquiring the effective time control solution. Compared with the time control technology with time buffer, embodiment 1 of the present invention limits the propagation of the uncertainty at each production task through the takt, which has higher robustness, and can provide better time guidance to the service subjects.

(II) Secondly, in the prior art, the impact of the task completion probability on the result is not considered. For the scenario focusing on the completion probability of the production process, another takt control model is established, and a takt solution for the collaboration of production processes with uncertain time is obtained by solving the model. Through the rational probability setting, embodiment 2 of the present invention not only can guarantee the completion of the task, but also can improve the collaboration efficiency. Different set probabilities can meet the time control requirements of different customers or cloud platforms for the collaboration of production processes.

(III) By combining Monte Carlo Simulation and the Particle Swarm Optimization algorithm, the present invention considers the uncertainties caused by the variability of the production time such as tasks are completed early or late, and relieves the limitation that the uncertain production time is required to comply with the same distribution type in the existing time collaboration control model, so that the production time can be modeled in any form according to the uncertainty of the production time such as uniform distribution, normal distribution and triangle distribution, thereby improving the practicability of the takt control model. When emergencies such as change of service providers, change of service content and the like occur in the collaborative production process, the present invention can adjust the input parameters to change consistently with the novel time attributes, and generates a new takt to control the time for the subsequent service processes, which is easy to operate and implement.

It should be noted that through the above description of the embodiments, those skilled in the art can clearly know that each embodiment can be implemented by virtue of software and necessary universal hardware platforms. Based on this understanding, the above technical solutions or the part contributing to the prior art can be essentially embodied in a form of software products. The computer software product can be stored in computer readable storage media, such as ROM/RAM, magnetic discs, compact discs, etc., including several instructions for making a computer device (which may be a personal computer, a server, or a network device, etc.) execute the methods described in each embodiment or some parts of the embodiment. Relational terms used herein such as first and second are only used to distinguish one entity or operation from another entity or operation, and do not necessarily require or imply any such actual relation or sequence between the entities or operations. Moreover, terms "include", "contain" or any other variations thereof are intended to cover non-exclusive inclusion, so that a process, method, article, or apparatus including a series of elements not only includes those elements but also includes other elements not expressly listed or also includes the intrinsic elements of the process, method, article, or apparatus. Without further limitations, an element defined by the sentence "including a . . . " does not exclude the presence of other same elements in the process, method, article or apparatus including the element.

The above embodiments are only used for illustrating the technical solutions of the present invention rather than limiting the present invention. Although the present invention is described in detail with reference to the above embodiments, it should be understood by those ordinary skilled in the art that the technical solutions described in the above embodiments may be modified or some technical features may be equivalently substituted. These modifications or substitutions do not make the essence of the corresponding technical solutions depart from the spirit and scope of the technical solutions of the embodiments of the present invention.

What is claimed is:

1. A method for the collaboration of production processes with uncertain time, comprising:
   determining n collaborative production tasks according to customer demand, and matching the n collaborative production tasks with n service providers;
   acquiring information of the n collaborative production tasks, wherein the information of the n collaborative production tasks comprises a service structure, distribution functions of production time and historical wasted time of each task;
   based on the information of the collaborative production tasks, establishing a takt control model targeting at minimizing estimated wasted time, wherein the takt control model comprises an objective function and constraints;
   solving the takt control model, and outputting a set of time intervals with the minimal estimated wasted time as a takt ST;

$$ST=\{[SS_1,SE_1], \ldots ,[SS_i,SE_i], \ldots ,[SS_n,SE_n]\}$$

wherein SS is the set start time of a task; SE is the set end time of a task; i is a serial number of the task and a service provider matching the task; and n is the quantity of tasks and service providers; and
   guiding each of the n service providers to handle the n collaborative production tasks according to $[SS_i, SE_i]$,
   wherein the constraints are:
   $s_0=d_0=0$, indicating that start and end time of a start node are moment 0,
   $d_i=s_i+t_i$, indicating relation among actual end time, actual start time and production time of a task i, $$s_j = \max\{SS_j, \max_{(i,j)\in A} (d_i)\},$$

indicating that the task i should be started immediately after reaching a set start time and a condition that a preceding task has been finished so as to reduce idle time between tasks, $$d_{n+1} = s_{n+1} = \max_{(1,n+1)\in A} (SE_i) \leq D,$$

indicating that completion time of entire collaborative production process should satisfy deadline set by customer,
   $SS_j \geq SE_i$, $\forall (i, j) \in A$, indicating that set start time of successive task in directly adjacent task pair having temporal relation must be later than set end time of preceding task,
   $SS_i$, $SE_i \geq 0$, indicating that set end time of the task i in the takt should be greater than set start time,
   $SE_i > SS_i$, indicating that set start time and set end time of any task in the takt should both be greater than or equal to moment 0, wherein s is actual start time of a task; t is production time for the service provider to complete the task; A is the set of directly adjacent service pairs; and D is completion deadline of a customer demand.

2. The method for the collaboration of production processes with uncertain time according to claim 1, wherein the information of the collaborative production tasks further comprises task completion probability.

3. The method for the collaboration of production processes with uncertain time according to claim 1, wherein the objective function is:

$$\min \theta_e = \min E[\Sigma_{i,j=1,(i,j) \in A}{}^n \theta_i \theta_j |SS_j - d_i|/n];$$

wherein $\theta$ indicates historical wasted time, and a calculation formula is $$\theta = \Sigma_{i,j=1,(i,j) \in A}{}^n |SS_j - d_i|/n;$$

$\theta_e$ indicates estimated wasted time, and a calculation formula is $$\theta_e = E[\Sigma_{i,j=1,(i,j) \in A}{}^n \theta_i \theta_j |SS_j - d_i|/n];$$

A indicates a set of directly adjacent service pairs;
d indicates an actual end time of the task.

4. The method for the collaboration of production processes with uncertain time according to claim 2, wherein the constraints further comprise:

$$s_0 = d_0 = 0$$

$$d_i = s_i + t_i$$

$$s_j = \max\{SS_j, \max_{(i,j) \in A}(d_i)\}$$

$$d_{n+1} = s_{n+1} = \max_{(i,n+1) \in A}(SE_i) \leq D$$

$$SS_j \geq SE_i, \forall (i,j) \in A$$

$$Pr\{t_i \leq SE_i - SS_i\} \geq p$$

$$SE_i > SS_i$$

wherein p indicates the task completion probability; and Pr{ } is a probability function.

5. The method for the collaboration of production processes with uncertain time according to claim 1, wherein the distribution functions of production time comprise: a normal distribution $N(\mu, \sigma^2)$ with mean value of $\mu$ and variance of $\sigma^2$, uniform distribution Uniform(a, b) in an interval [a, b] or triangle distribution Triangle (a, m, b) with a modal number of m in the interval [a, b].

6. The method for the collaboration of production processes with uncertain time according to claim 1, wherein in the step of solving the takt control models, a particle swarm optimization algorithm embedded with Monte Carlo Simulation is used, which is specifically as follows:
an objective function value corresponding to each set of time intervals is calculated by Monte Carlo Simulation as fitness of the particle swarm algorithm, then the particle swarm algorithm is used to optimize and solve the problem, and finally the set of time intervals with the minimal estimated wasted time.

7. A takt system for the collaboration of production processes with uncertain time, comprising a memory, a processor, and computer programs stored on the memory and capable of running on the processor, wherein when executing the computer programs, the processor implements:

determining n collaborative production tasks according to customer demand, and matching the n collaborative production tasks with n service providers;

acquiring information of the n collaborative production tasks, wherein the information of the n collaborative production tasks comprises a service structure, distribution functions of production time and historical wasted time of each task;

based on the information of the collaborative production tasks, establishing a takt control model targeting at minimizing the estimated wasted time, wherein the takt control model comprises an objective function and constraints;

solving the takt control model, and outputting a set of time intervals with the minimal estimated wasted time as a takt ST;

$$ST = \{[SS_1, SE_1], \ldots, [SS_i, SE_i], \ldots, [SS_n, SE_n]\}$$

wherein SS is the set start time of a task; SE is the set end time of a task; i is a serial number of the task and a service provider matching the task; and n is the quantity of tasks and service providers; and guiding each of the service providers to handle the n collaborative production tasks according to $[SS_i, SE_i]$, wherein the constraints are:

$s_0 = d_0 = 0$, indicating that start and end time of a start node are moment 0, $d_i = s_i + t_i$, indicating relation among actual end time, actual start time and production time of a task i, $$s_j = \max\left\{SS_j, \max_{(i,j) \in A}(d_i)\right\},$$

indicating that the task i should be started immediately after reaching a set start time and a condition that a preceding task has been finished so as to reduce idle time between tasks, $$d_{n+1} = s_{n+1} = \max_{(1,n+1) \in A}(SE_i) \leq D,$$

indicating that completion time of entire collaborative production process should satisfy deadline set by customer, $SS_j \geq SE_i$, $\forall (i, j) \in A$, indicating that set start time of successive task in directly adjacent task pair having temporal relation must be later than set end time of preceding task, $SS_i$, $SE_i \geq 0$, indicating that set end time of the task i in the takt should be greater than set start time, $SE_i > SS_i$, indicating that set start time and set end time of any task in the takt should both be greater than or equal to moment 0, wherein s is actual start time of a task; t is production time for the service provider to complete the task; A is the set of directly adjacent service pairs; and D is completion deadline of a customer demand.

8. The takt system according to claim 7, wherein the information of the collaborative production tasks further comprises completion probability.

9. The takt system according to claim 7, wherein the objective function is:

$$\min \theta_e = \min E[\Sigma_{i,j=1,(i,j) \in A}{}^n \theta_i \theta_j |SS_j - d_i|/n];$$

wherein θ indicates historical wasted time, and a calculation formula is $$\theta = \Sigma_{i,j=1,(i,j)\in A}^{n} |SS_j - d_i|/n;$$

$\theta_e$ indicates estimated wasted time, and a calculation formula is $$\theta_e = E[\Sigma_{i,j=1,(i,j)\in A}^{n} \theta_i \theta_j |SS_j - d_i|/n];$$

A indicates a set of directly adjacent service pairs;

d indicates an actual end time of the task.

10. The takt system according to claim 8, wherein the constraints further comprise:

$$Pr\{t_i \leq SE_i - SS_i\} \geq p$$

$$SE_i > SS_i$$

wherein p indicates the task completion probability; and Pr{ } is a probability function.

11. The takt system according to claim 7, wherein the distribution functions of production time comprise: a normal distribution $N(\mu, \sigma^2)$ with mean value of $\mu$ and variance of $\sigma^2$, uniform distribution Uniform(a, b) in an interval [a, b] or triangle distribution Triangle(a, m, b) with a modal number of m in the interval [a, b].

12. The takt system according to claim 7, wherein the processor is further configured for:
  calculating an objective function value corresponding to each set of time intervals by Monte Carlo Simulation as fitness of the particle swarm algorithm, then the particle swarm algorithm is used to optimize and solve the problem, and finally determining set of time intervals with the minimal estimated wasted time.

* * * * *